United States Patent [19]

DeVlieg et al.

[11] 4,322,809
[45] Mar. 30, 1982

[54] METHOD AND APPARATUS FOR GENERATING NOSE WHEEL SPEED SIGNALS

[75] Inventors: Garrett H. DeVlieg; Andrew M. Valaas, both of Bellevue, Wash.

[73] Assignee: The Boeing Company, Seattle, Wash.

[21] Appl. No.: 141,441

[22] Filed: Apr. 18, 1980

[51] Int. Cl.³ .............................................. B60T 8/02
[52] U.S. Cl. ..................................... 364/565; 364/426; 303/96; 303/109
[58] Field of Search ............. 364/565, 426; 340/27 R; 244/111; 303/96, 106, 109

[56] References Cited

U.S. PATENT DOCUMENTS

| | | | |
|---|---|---|---|
| 3,712,122 | 1/1973 | Harris et al. | 340/27 R |
| 3,802,749 | 4/1974 | Carp et al. | 303/96 |
| 3,870,378 | 3/1975 | Carp | 303/96 |
| 4,053,188 | 10/1977 | Jonner | 303/96 |
| 4,076,331 | 2/1978 | DeVlieg | 244/111 |
| 4,134,621 | 1/1979 | Smedley et al. | 303/109 |
| 4,164,872 | 8/1979 | Weigl | 303/96 |

Primary Examiner—Mark E. Nusbaum
Assistant Examiner—Gary Chin
Attorney, Agent, or Firm—Conrad O. Gardner; B. A. Donahue

[57] ABSTRACT

Left and right main gear wheel speed signals are processed by a circuit which is a model of aircraft rigid body motion to provide a synthesized nose wheel velocity representative signal.

2 Claims, 3 Drawing Figures

METHOD AND APPARATUS FOR GENERATING NOSE WHEEL SPEED SIGNALS

This invention relates to generation of signals representative of wheel speed of an aircraft and more particularly signals representative of nose wheel speed.

Heretofore, the output of an anti-skid generator has been utilized for calculating aircraft acceleration during takeoff as is shown in U.S. Pat. No. 2,947,502. Also, an aircraft touchdown indicating system as shown in U.S. Pat. No. 3,500,307 has utilized signals from tachometer generators on left and right main wheels to provide the indication.

Utilization of additional transducers to provide nose wheel speed signals requires nose wheel axle design for their incorporation thereon and further increases weight thereof.

Accordingly, it is an object of this invention to provide means for generating nose wheel speed signals without requiring utilization of nose gear transducers.

It is a further object of this invention to provide means for synthesizing nose wheel speed signals from main gear wheel speed signals.

It is another object of this invention to provide a method for deriving nose wheel speed representative signals from main gear wheel speed signals incorporating selection of the largest one of a plurality of signals.

It is still another object of this invention to provide a means for approximating nose gear wheel speed with a maximum error of less than about four percent between nose gear steering limits of about plus or minus sixty-five degrees.

Further objects and features of the present invention will become apparent in the course of the reading of the following specification and drawings wherein.

Figure 1:
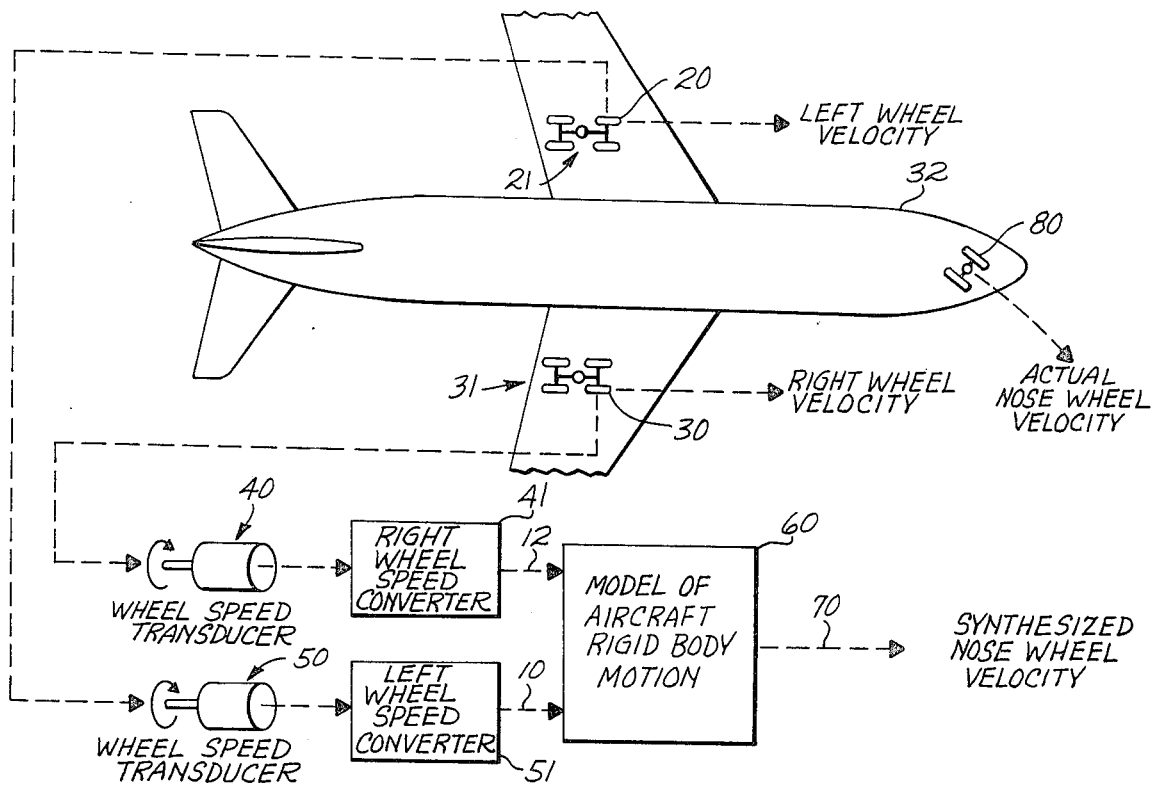
FIG. 1 is a block diagram of the present method and apparatus for generating nose wheel speed signals.

Turning now to FIG. 1, it will be observed that left and right main gear wheel speeds 10 and 12 respectively are developed from outboard wheels 20 and 30 of trucks 21 and 31 on respective left and right sides of the aircraft 32. Wheel speed transducers 40 and 50 conventionally counted (and already present as a portion of the aircraft anti-skid system, not shown) at wheels 30 and 20 respectively are coupled to conventional right and left wheel speed converter circuits 41 and 51 respectively to provide signals 12 and 10 representative respectively of outboard right main gear wheel 30 and outboard left main gear wheel 20. A converter circuit 60 shown in detail in FIG. 2 converts signals 12 and 10 representative of outboard right main gear wheel speed and outboard left main gear wheel speed respectively into a synthesized nose wheel velocity signal 70 representative of actual nose gear wheel 80 wheelspeed.

Figure 2:
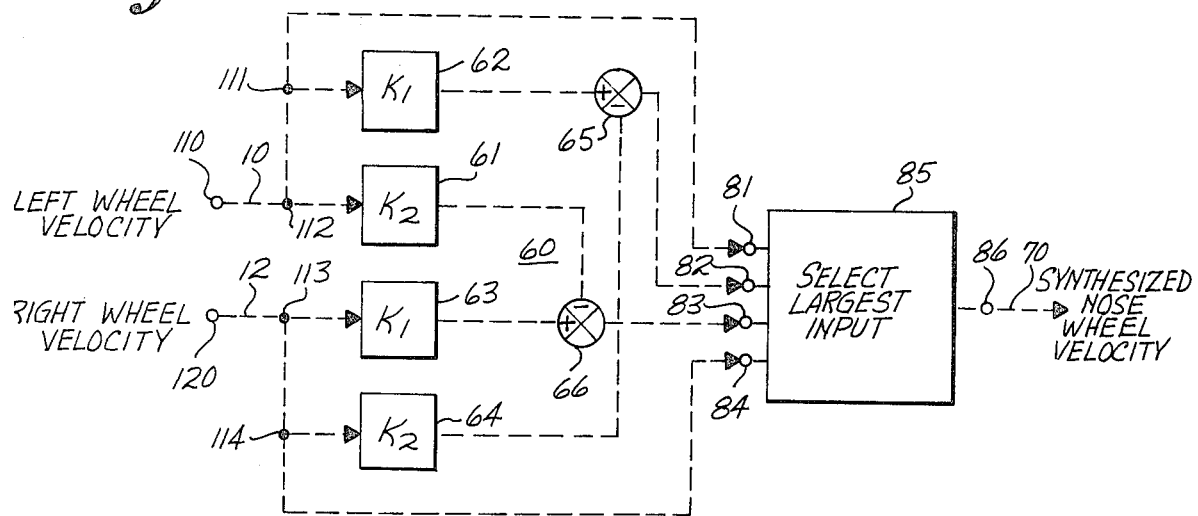
FIG. 2 is a schematic diagram of a wheel speed converter circuit embodiment of the model of aircraft rigid body motion of the system of FIG. 1; and, FIG. 3 is a graph showing the solution provided by the circuit embodiment of FIG. 2.

FIG. 2 is one embodiment, viz. an analog circuit implementation of the model of aircraft rigid body motion shown in block form in the system of FIG. 1, and is based on a linear approximation of the exact solution. The following theory of operation of approximation of nosewheel velocity from main gear wheel velocity as provided in converter circuit 60 is helpful in understanding the basic operation of converter circuit 60:

For steered angles below about thirty degrees, the velocity of the outboard main gear wheels approximates the velocity of the nose gear wheels within about five percent. Above about thirty degrees, the velocity of the nose gear wheels is to a close approximation:

$$V_N = 1.8 V_O - 1.1 V_I$$

where $V_N$ is nose gear wheel velocity and $V_O$ and $V_I$ are the velocity of the main gear (outboard wheels) on the outside and inside of the turn. Since both left and right turns are possible, the desired approximation of nosewheel velocity is indicated by the greater amplitude of the following:

(a) left outboard main gear wheel velocity ($V_L$)
(b) right outboard main gear wheel velocity ($V_R$)
(c) $1.8 V_L - 1.1 V_R$
(d) $1.8 V_R - 1.1 V_L$ Turning now more specifically to the converter circuit embodiment 60 in FIG. 2, it can be seen that first input terminal 110 is connected to input terminals 111 and 112 respectively of first and second amplifier circuit means 62 and 61 having respective gains of $K_1 = 1.8$ and $K_2 = 1.1$ while second input terminal 120 is connected to input terminals 113 and 114 respectively of third and fourth amplifier circuit means 63 and 64 having respective gains of $K_1 = 1.8$ and $K_2 = 1.1$. The output of first amplifier circuit means 62 is coupled to a first input of first summing circuit 65, and the output of fourth amplifier circuit means 64 is coupled to a second input of first summing circuit 65, the output of first summing circuit 65 being coupled to a second input terminal of select largest input circuit 85. Select largest input circuit 85 may comprise e.g. a diode connected in series with each of input terminals 81, 82, 83, and 84 and connected to a common point such as the input resistor of an operational amplifier.

The outputs of second and third amplifier circuit means 61 and 63 comprise first and second inputs respectively of second summing circuit 66, the output of the second summing circuit 66 being connected to third input terminal 83 of select largest input circuit 85.

Input terminal 111 of first amplifier circuit means 62 is connected to first input terminal 81 of select largest input circuit 85 while input terminal 114 of fourth amplifier circuit means 64 is connected to fourth input terminal 84 of select largest input circuit 85. Output terminal 86 of select largest input circuit 85 provides synthesized nose wheel velocity signal 70 which is the largest amplitude one of the plurality of signals present at input terminals 81, 82, 83, and 84 is the manner hereinbefore discussed in terms of theory of operation of converter circuit 60. Synthesized nose wheel velocity signal 70 may then be coupled to display means (not shown) for the pilot or other utilization means. Display of nose wheel velocity signal 70 can be utilized by the pilot in observing lateral acceleration limits for the aircraft.

Figure 3:
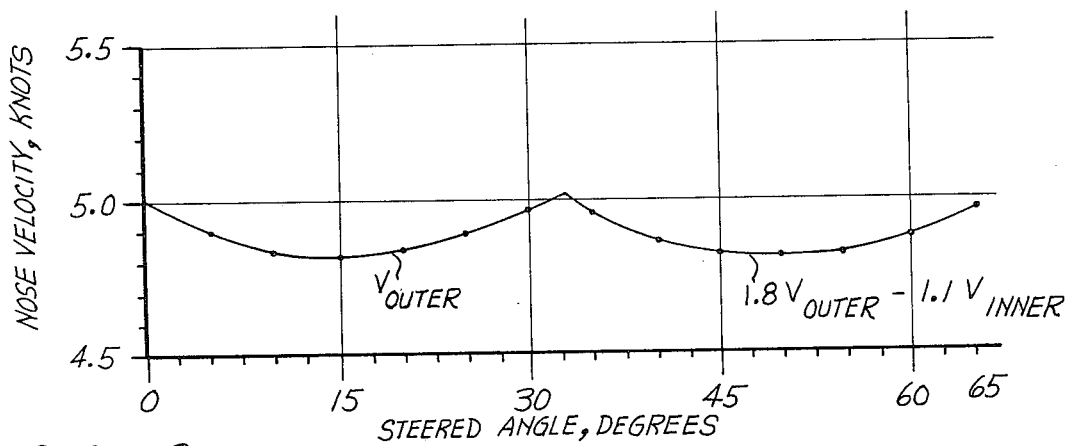

It can be seen now from FIG. 3 that actual nose wheel velocity results from maintaining a constant five knot nosewheel velocity in accordance with the system of FIG. 1 incorporating the converter circuit of FIG. 2. An observation of the plot of FIG. 3 shows the present method and apparatus to provide a maximum error of about four percent between the nose gear steering limits of plus or minus sixty-five degrees.

Further, variations of the present method include an exact synthesis or more approximate synthesis of nose-wheel velocity. It can be seen, therefore, that in accordance with the present method, speed at any point on or external to the aircraft may be synthesized utilizing speed of two wheels.

We claim:

1. A converter circuit for generating nose wheel speed signals from main landing gear wheel speed signals by selecting the greater of:

$V_L$;
$V_R$;
$K_1 V_L - K_2 V_R$; and,
$K_1 V_R - K_2 V_L$ where $V_L$ and $V_R$ are the signals representative of left and right main gear wheel velocities, and $K_1$ and $K_2$ are fixed constants, said converter comprising:

means for generating the said $V_L$ and $V_R$ signals;
a first converter input terminal;
a second converter input terminal;
a converter output has a plurality of terminals;
a select largest input circuit having an output terminal coupled to said converter output terminals, said select largest input circuit having first, second, third, and fourth input terminals;

a first summing circuit having a plurality of input terminals coupled to said $V_L$ and $V_R$ signals for generating $K_1 V_L - K_2 V_R$, and an output terminal coupled to said second input terminal of said select largest input circuit; a second summing circuit having a plurality of input terminals coupled to said $V_L$ and $V_R$ signals for generating $K_1 V_R - K_2 V_L$, and an output terminal coupled to said third input terminal of said select largest input circuit;

a first conductive circuit coupled said $V_L$ signal to said first converter input terminal and to said first input terminal of said select largest input circuit; and a second conductive circuit coupled said $V_R$ signal to said second converter input terminal and to said fourth input terminal of said select largest input circuit;

a first conductive circuit connection between said first converter input terminal and said first input terminal of said select largest input circuit; and a second conductive circuit connection between said second converter input terminal and said fourth input terminal of said select largest input circuit.

2. The invention according to claim 1 wherein the gains of said first and third amplifier circuit means equals about 1.8 and the gains of said second and fourth amplifier circuit means equals about 1.1.

* * * * *